(12) United States Patent
Li

(10) Patent No.: US 12,099,383 B2
(45) Date of Patent: Sep. 24, 2024

(54) DISPLAY METHOD AND DEVICE

(71) Applicant: Lenovo (Beijing) Limited, Beijing (CN)

(72) Inventor: Jia Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 5 days.

(21) Appl. No.: 18/313,709

(22) Filed: May 8, 2023

(65) Prior Publication Data
US 2023/0418333 A1 Dec. 28, 2023

(30) Foreign Application Priority Data
Jun. 27, 2022 (CN) .......................... 202210736651.1

(51) Int. Cl.
*G06F 1/16* (2006.01)
*G09G 3/20* (2006.01)

(52) U.S. Cl.
CPC .......... *G06F 1/1649* (2013.01); *G06F 1/1698* (2013.01); *G09G 3/2092* (2013.01); *G06F 2200/16* (2013.01); *G09G 2320/0613* (2013.01); *G09G 2320/08* (2013.01)

(58) Field of Classification Search
CPC .... G06F 1/1649; G06F 1/1698; G09G 3/2092
USPC .......................................................... 345/55
See application file for complete search history.

(56) References Cited

U.S. PATENT DOCUMENTS

| | | | |
|---|---|---|---|
| 2007/0176787 A1* | 8/2007 | Iten ........................ | G08C 23/04 340/12.22 |
| 2008/0186979 A1* | 8/2008 | Kolar .................. | H04L 65/1059 348/E7.086 |
| 2010/0302455 A1* | 12/2010 | Maegaki .............. | H04N 21/436 348/706 |

* cited by examiner

*Primary Examiner* — Calvin C Ma
(74) *Attorney, Agent, or Firm* — ANOVA LAW GROUP, PLLC

(57) ABSTRACT

A display method applied to a first electronic device includes obtaining a first display request sent by a second electronic device and a second display request sent by a third electronic device, determining a first channel of display data from a plurality of channels of display data configured at the first electronic device based on the first display request and transmitting the first channel of display data to the second electronic device to output the first channel of display data in a display unit of the second electronic device, and determining a second channel of display data from the plurality of channels of display data based on the second display request and transmitting the second channel of display data to the third electronic device to output the second channel of display data in a display unit of the third electronic device.

20 Claims, 5 Drawing Sheets

DISPLAY METHOD AND DEVICE

CROSS-REFERENCE TO RELATED APPLICATION

This application claims priority to Chinese Patent Application No. 202210736651.1, filed on Jun. 27, 2022, the entire content of which is incorporated herein by reference.

TECHNICAL FIELD

The present disclosure relates to the display technology field and, more particularly, to a display method and a display device.

BACKGROUND

A user can have different kinds of electronic devices. Often, the user desires to display same or different contents simultaneously using a plurality of electronic devices. Based on this, a technical problem of displaying one or more display contents of an electronic device on another or displaying on a plurality of electronic devices needs to be solved.

SUMMARY

Embodiments of the present disclosure provide a display method applied to a first electronic device. The method includes obtaining a first display request sent by a second electronic device and a second display request sent by a third electronic device, determining a first channel of display data from a plurality of channels of display data configured at the first electronic device based on the first display request and transmitting the first channel of display data to the second electronic device to output the first channel of display data in a display unit of the second electronic device, and determining a second channel of display data from the plurality of channels of display data based on the second display request and transmitting the second channel of display data to the third electronic device to output the second channel of display data in a display unit of the third electronic device.

Embodiments of the present disclosure provide a display device applied to a first electronic device, including a request acquisition unit, a first display processing unit, and a second display processing unit. The request acquisition unit is configured to obtaining a first display request sent by a second electronic device and a second display request sent by a third electronic device. The first display processing unit is configured to determine a first channel of display data from a plurality of channels of display data configured at the first electronic device based on the first display request and transmit the first channel of display data to the second electronic device to output the first channel of display data in a display unit of the second electronic device. The second display processing unit is configured to determine a second channel of display data from the plurality of channels of display data based on the second display request and transmit the second channel of display data to the third electronic device to output the second channel of display data in a display unit of the third electronic device.

Embodiments of the present disclosure provide a non-transitory computer-readable storage medium. The medium stores a program instruction that, when executed by one or more processors, causes the one or more processors to obtain a first display request sent by a second electronic device and a second display request sent by a third electronic device, determine a first channel of display data from a plurality of channels of display data configured at the first electronic device based on the first display request and transmit the first channel of display data to the second electronic device to output the first channel of display data in a display unit of the second electronic device, and determine a second channel of display data from the plurality of channels of display data based on the second display request and transmit the second channel of display data to the third electronic device to output the second channel of display data in a display unit of the third electronic device.

DETAILED DESCRIPTION OF THE EMBODIMENTS

In the technical solution of embodiments of the present disclosure, a plurality of electronic devices can be used as extension screens of an electronic device. The plurality of electronic devices do not include the electronic device. Thus, same or different display contents from the electronic device can be displayed on the plurality of electronic devices simultaneously.

The technical solution of the present disclosure can be applied to a scenario of a local area network, an internet, or another wireless network. Correspondingly, the plurality of electronic devices that can be used as the extension screens of the electronic device can include other electronic devices in the same local area network or internet with the electronic device or electronic devices in a remote network.

The technical solution of embodiments of the present disclosure is described in detail below in connection with the accompanying drawings of embodiments of the present disclosure. Obviously, described embodiments are only some embodiments of the present disclosure not all embodiments. All other embodiments obtained by those skilled in the art without creative efforts should be within the scope of the present disclosure.

Figure 1:
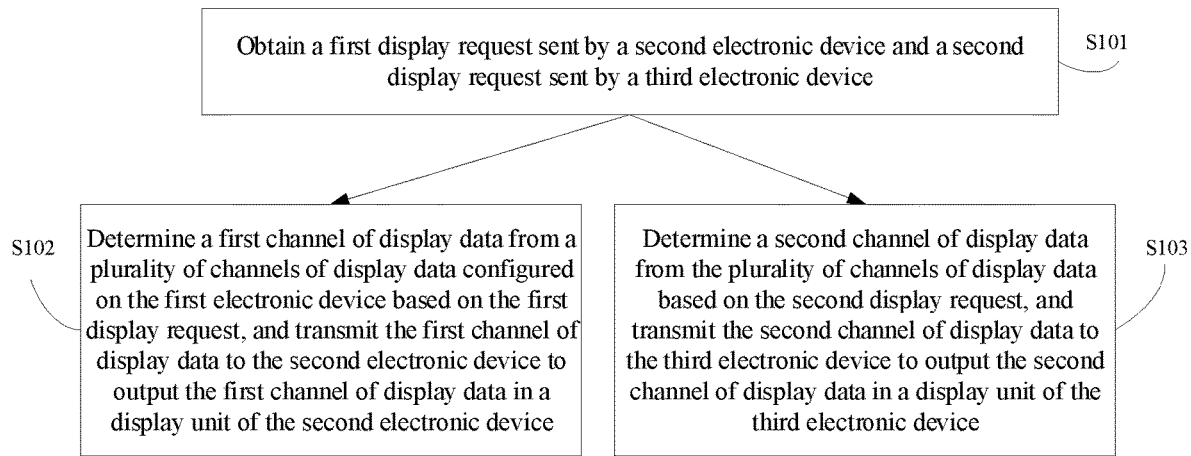
FIG. 1 illustrates a schematic flowchart of a display method according to some embodiments of the present disclosure.

FIG. 1 illustrates a schematic flowchart of a display method according to some embodiments of the present disclosure. The method of embodiments of the present disclosure can be applied to an electronic device. The electronic device can include a cell phone, a tablet computer, a desktop computer, etc. To distinguish from other electronic devices that need to obtain display data from the electronic device, the electronic device can be referred to as a first electronic device.

The method of embodiments of the present disclosure can include the following processes.

At S101, a first display request sent by a second electronic device and a second display request sent by a third electronic device are obtained.

The second electronic device and the third electronic device can be the other electronic devices besides the first electronic device. The second electronic device and the third electronic device can also be different kinds of apparatuses. For example, the second electronic device and the third electronic device can be any one of a cell phone, a tablet computer, a notebook computer, a television, or a stereo with a display unit.

The display request sent by the other electronic devices to the first electronic device can be used to request display data from the first electronic device that needs to be displayed. To facilitate distinguishment, in the present disclosure, a display request sent by the second electronic device can be referred to as a first display request, and a display request sent by the third electronic device can be referred to as a second display request.

In the present disclosure, the second electronic device and the third electronic device can both send the display requests to the first electronic device through wireless connections with the first electronic device.

In some embodiments, the second electronic device and the third electronic device may not necessarily send the display requests to the first electronic device simultaneously. Thus, the time when the first electronic device obtains the first display request can be different from the time when the first electronic device obtains the second display request. For example, the first electronic device can obtain the second display request after obtaining the first display request for a period of time. In some other embodiments, the first electronic device can obtain the second display request first and then obtain the first display request.

At S102, a first channel of display data is determined from a plurality of channels of display data configured on the first electronic device based on the first display request, and the first channel of display data is transmitted to the second electronic device to output the first channel of display data in a display unit of the second electronic device.

The plurality of channels of display data configured at the first electronic device can be display data used for display.

In the present disclosure, the plurality of channels of display data can be configured at the electronic device in different manners.

For example, a plurality of independent resource spaces can be deployed at the electronic device. In the present disclosure, display data can be assigned to the different resource spaces. Thus, each channel of display data can correspond to a resource space. A channel of display data of the different resource spaces can be provided to and displayed by a display unit of the electronic device.

The plurality of resource spaces can be a plurality of memory resource areas partitioned at the electronic device, resource spaces corresponding to different operating systems, or different graphics card resources, which is not limited here.

In some embodiments, at least one virtual display can be created at the first electronic device before the first electronic device receives the display request sent by another electronic device. Different virtual displays can correspond to different resource spaces.

Based on this, a user can configure display data for the virtual display of the first electronic device and a physical display connected to or included by the first electronic device. Thus, the plurality of channels of display data corresponding to different virtual displays or physical displays can be obtained. Since the resource spaces corresponding to the virtual display and the physical display can be different, the plurality of channels of display data can correspond to different resource spaces.

Accordingly, the first electronic device can determine display data configured for at least one virtual display and at least one physical display of the first electronic device to obtain the plurality of channels of display data configured at the first electronic device.

In some embodiments, the contents of the plurality of channels of display data configured at the electronic device can be the same or different according to different requirements, which are not limited here.

At S103, a second channel of display data is determined from the plurality of channels of display data based on the second display request. The second channel of display data is transmitted to the third electronic device to output the second channel of display data in a display unit of the third electronic device.

In the present disclosure, to facilitate distinguishment, a channel of display data determined for the second electronic device can be referred to as a first channel of display data, and a channel of display data determined for the third electronic device can be referred to as a second channel of display data.

Since the contents of different channels of display data can be the same or different, the first channel of display data and the second channel of display data can have a same display content or different display contents. Correspondingly, when the second electronic device displays the first channel of display data, and the third electronic device displays the second channel of display data, the first electronic device and the third electronic device can display the same display content or different display contents.

When the second electronic device and the third electronic device send the display requests to the first electronic device through a wireless communication, the first electronic device can send the first channel of display data to the second electronic device through the wireless communication and send the second channel of display data to the third electronic device.

According to the technical solution of the present disclosure, the plurality of channels of display data configured at the first electronic device can be displayed by the plurality of electronic devices. In embodiments of the present disclosure, the first electronic device sending the display data to the second electronic device and the third electronic device for display is taken as an example for illustration. However, in the some embodiments, more than two (e.g., three, four, or more) electronic devices can send display requests to the first electronic device. Thus, a process of the first electronic device sending display data to the electronic devices that send the display requests can be similar, which is not repeated here.

Based on the above, in embodiments of the present disclosure, the first electronic device can obtain the display requests sent by the plurality of other electronic devices. For each electronic device of the plurality of other electronic devices sending the display request, the first electronic device can determine and send a channel of display data to the electronic device of the plurality of other electronic devices. Thus, the plurality of channels of display data of the first electronic device that are the same or different can be displayed at the plurality of other electronic devices. Therefore, the display units of the plurality of other electronic devices can be used as an extension screen of the first electronic device.

In addition, the second electronic device and the third electronic device can send the display requests to the first electronic device through the wireless communication and obtain corresponding display data. Thus, the display data of the first electronic device can be transmitted to the second electronic device and the second electronic device for display without building a physical wiring connection among the first electronic device. The complexity of the first electronic device using the plurality of other electronic devices to extend the screen can be reduced, and the first electronic device can extend the display units of the other electronic devices in the same local area network or the remote network as display units of the first electronic device.

In the present disclosure, based on the plurality of channels of display data configured at the first electronic device, a channel of display data can be determined for one of the plurality of other electronic devices sending the display request in different manners, which is not limited here.

To facilitate understanding, some manners of the first electronic device determining the display data for the plurality of other electronic devices are exemplarily described below.

For example, in some embodiments, the first display request received by the first electronic device can include type information used to indicate an apparatus type of the second electronic device. Then, in response to the first display request, the first electronic device can determine the first channel of display data suitable for the apparatus type of the second electronic device from the plurality of channels of display data configured at the first electronic device.

For example, the second electronic device can be a television. Then, in connection with a data format supported by the television, a channel of display belonging to the data format supported by the television can be determined from the plurality of channels of display data as the first channel of display data.

Accordingly, the second display request received by the first electronic device can include type information indicating an apparatus type of the third electronic device. Accordingly, in response to the second display request, the first electronic device can determine the second channel of display data suitable for the apparatus type of the third electronic device from the plurality of channels of display data configured at the first electronic device.

In some other embodiments, the display request received by the first electronic device can include a display identifier used to indicate display data. Based on this, the first electronic device can determine a channel of display data corresponding to the display identifier from the plurality of channels of display data based on the display identifier carried by the display request and transmit the channel of display data to one of the plurality of channels of other electronic devices sending the display request.

For any electronic device (e.g., the second electronic device, the third electronic device, etc.) other than the first electronic device, the electronic device can obtain the display identifier of the required display data in different manners.

For example, the user can enter a display identifier of required display data to trigger the electronic device to generate a display request including the display identifier.

For another example, before sending the display request to the first electronic device, the electronic device can also request display identifiers of the plurality of channels of display data configured at the first electronic device from the first electronic device. Thus, the user can select a display identifier of the required display data.

By taking an example of the other electronic devices other than the first electronic device obtaining the display identifier of the display data from the first electronic device, the technical solution of the present disclosure is described below.

Figure 2:
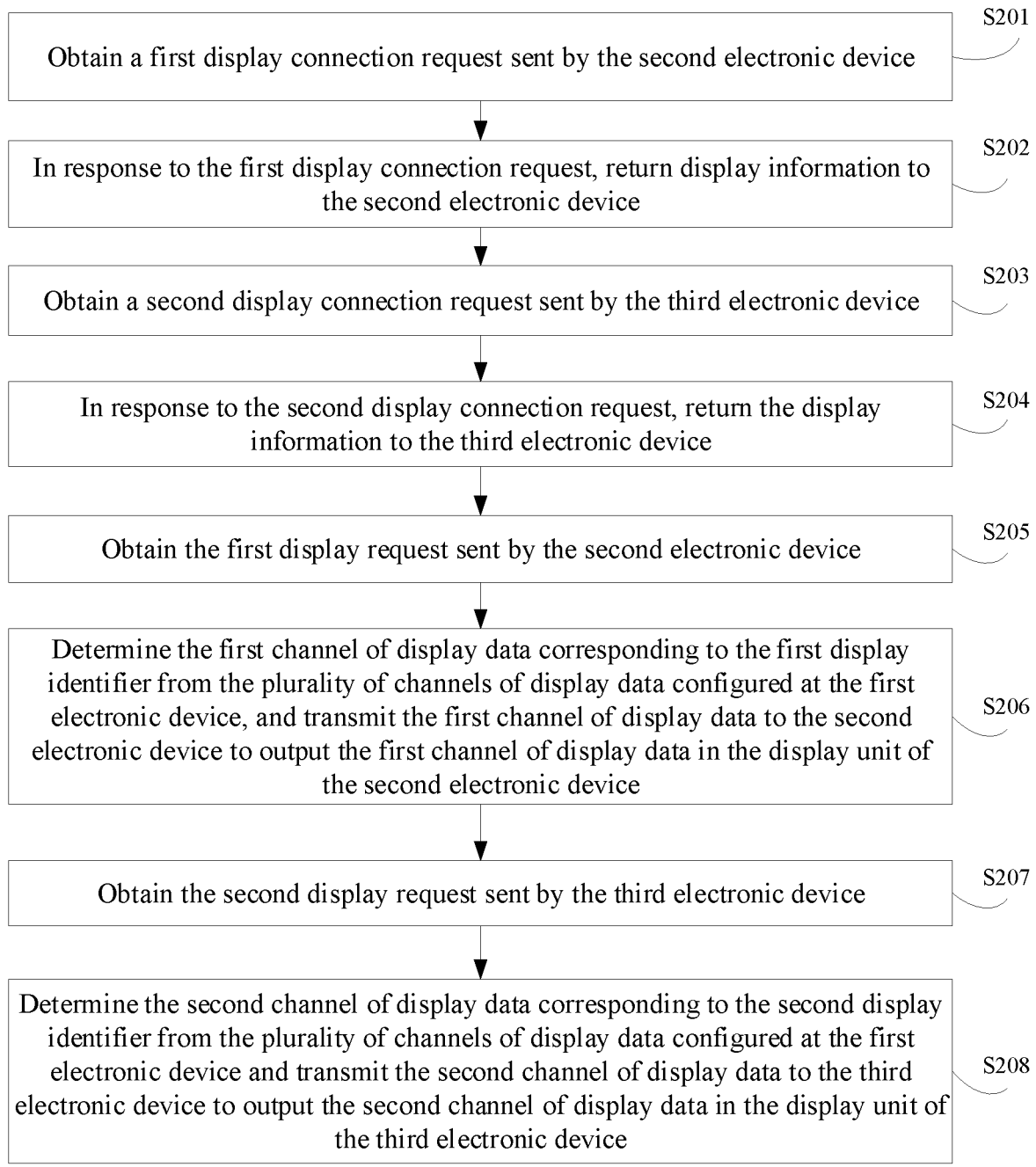
FIG. 2 illustrates a schematic flowchart of another display method according to some embodiments of the present disclosure.

FIG. 2 illustrates a schematic flowchart of another display method according to some embodiments of the present disclosure. The method of the embodiment of the present disclosure includes the following processes.

At S201, a first display connection request sent by the second electronic device is obtained.

The first display connection request can be used to request to establish a connection with the first electronic device. The connection can be a communication connection used to transmit the display data. For example, the communication connection can include various kinds of wireless connections.

The first display connection request can be a connection request transmitted based on the wireless communication connection between the first electronic device and the second electronic device and requesting to transmit display data information, or a connection request to establish a wireless communication connection.

In some embodiments, the first electronic device can also obtain the first display connection request sent by the second electronic device based on a real-time communication protocol.

For example, a real-time communication connection based on the real-time communication protocol can be established between the first electronic device and the second electronic device. Accordingly, the first electronic device can obtain the first display connection request sent by the second electronic device based on the real-time communication connection established between the first electronic device and the second electronic device.

For another example, the first electronic device can obtain the first display connection request sent by the second electronic device based on the real-time communication protocol. The first display connection request can be used to request to establish the real-time communication connection between the first electronic device and the second electronic device based on the real-time communication protocol. The real-time communication connection can be used to transmit the display data.

The real-time communication protocol can include various protocols. For example, the real-time communication protocol can be a real-time transport protocol (RTP).

In some embodiments, to improve data transmission efficiency between electronic devices and reduce complexity of wireless communication, the real-time communication protocol adopted in the present disclosure can be a web real-time communication (WebRTC) protocol.

The WebRTC protocol is an application program interface supporting a web browser to perform real-time audio conversation or video conversation. The data can be transmitted efficiently by using the WebRTC protocol. The WebRTC protocol can support one-to-one data transmission between electronic devices and also one-to-multiple data transmission. Therefore, the first electronic device can simultaneously transmit data with the plurality of other electronic devices based on the WebRTC protocol.

In some embodiments, a signal service process supporting the WebRTC protocol can be created at the first electronic device. The first electronic device can transmit information with the other electronic devices through the signal service process. Accordingly, the second electronic device can establish a WebRTC connection through the Web client terminal and the signal service process of the first electronic device. Thus, a display connection request, a display request, and reception or transmission of the display data can be transmitted based on WebRTC.

At S202, in response to the first display connection request, display information is returned to the second electronic device.

The display information can include display identifiers corresponding to the plurality of channels of display data configured at the first electronic device. One display identifier can be used to uniquely indicate one channel of display data of the first electronic device.

In the present disclosure, the display information can further include a display parameter related to each channel of display data, such as a data format of the display data and an appropriate resolution, which is not limited.

In some embodiments, to cause a user of the second electronic device to more conveniently and appropriately select a display content that needs to be presented, the display information can further include preview pictures corresponding to the plurality of channels of display data.

Of course, the display information can also include other information related to the display data as needed, which is not limited here.

At S203, a second display connection request sent by the third electronic device is obtained.

Similar to obtaining the second display connection request above, the second display connection is also used to request a connection to be established with the first electronic device for enabling display data transfer.

Similarly, the second display connection request can be a connection request transmitted based on the wireless communication connection between the first electronic device and the third electronic device and used to request to transmit the display data information or a connection request to establish the wireless communication connection. For example, the first electronic device can obtain the first display connection request sent by the second electronic device based on the real-time communication protocol, which can be referred to the related description of step S202 and is not repeated here.

At S204, in response to the second display connection request, the display information is returned to the third electronic device.

The display information can be the same as the display information in step S202, which is not repeated here.

In some embodiments, a sequence in which the second electronic device and the third electronic device send the display connection requests cannot be limited. For example, the sequence in which the two apparatuses send the display connection requests can be exchanged, or the two apparatuses can send the display connection requests simultaneously, which is not limited.

At S205, the first display request sent by the second electronic device is obtained.

The first display request can include the first display identifier used to indicate the display data.

The first display identifier can be one of the display identifiers of the plurality of channels of display data configured at the first electronic device.

To facilitate distinguishment, the display identifier carried in the first display request sent by the second electronic device can be referred to as the first display identifier. The display identifier carried in the second display request sent by the third electronic device can be referred to as the second display identifier.

When the wireless communication connection is established between the first electronic device and the second electronic device, the first electronic device can obtain the first display request sent by the second electronic device through the wireless communication connection.

As described above, various wireless communication connections can be included.

For example, the wireless communication connection can be a real-time communication connection. The real-time communication connection can be a wireless connection established based on the real-time communication protocol. Correspondingly, the first electronic device can obtain the first display request sent by the second electronic device based on the real-time communication connection established between the first electronic device and the second electronic device. For the real-time communication protocol, reference can be made to the related description above, which is not repeated here.

At S206, the first channel of display data corresponding to the first display identifier is determined from the plurality of channels of display data configured at the first electronic device. The first channel of display data is transmitted to the second electronic device to output the first channel of display data in the display unit of the second electronic device.

To facilitate distinguishment, the display data configured at the first electronic device and corresponding to the first display identifier can be referred to as the first channel of display data. The display data corresponding to the second display identifier carried in the second display request can be referred to as the second channel of display data.

When the wireless communication connection is established between the first electronic device and the second electronic device, the first electronic device can transmit the first channel of display data to the second electronic device through the wireless communication connection. Thus, a channel of display data on a side of the first electronic device can be displayed on a side of the second electronic device through the wireless network communication connection.

For example, when the WebRTC connection is established between the first electronic device and the second electronic device, the first electronic device can transmit the first channel of display data to the Web client terminal at the second electronic device using the WebRTC protocol.

At S207, the second display request sent by the third electronic device is obtained.

The second display request can include the second display identifier used to indicate the display data.

The second display identifier and the first display identifier can be a same display identifier or different display identifiers.

Similar to the first electronic device obtaining the first display request, the first electronic device can obtain the second display request transmitted by the third electronic device based on the wireless communication connection between the first electronic device and the third electronic device. For example, the first electronic device can obtain the second display request sent by the third electronic device based on the real-time communication connection established between the first electronic device and the third electronic device.

At S208, the second channel of display data corresponding to the second display identifier is determined from the plurality of channels of display data configured at the first electronic device. The second channel of display data is transmitted to the third electronic device to output the second channel of display data in the display unit of the third electronic device.

The first electronic device can transmit the second channel of display data to the third electronic device based on the wireless communication connection between the first electronic device and the third electronic device, which is similar to transmitting the first channel of display data to the second electronic device and is not repeated here.

If the second channel of display data is different from the first channel of display data, the first electronic device can display different display data to different electronic devices through a wireless manner. Thus, the electronic devices can display different display contents at the plurality of other electronic devices in a wireless manner.

Of course, if the second channel of display data and the first channel of display data are a same channel of display data or have a same display content, the first electronic device can simultaneously.

In some embodiments, the first electronic device can determine the first channel of display data and the second channel of display data in a same manner. In some other embodiments, the first electronic device can also determine the first channel of display data and the second channel of display data in different manners.

For example, the first display request can include type information used to indicate the apparatus type of the second electronic device. Based on this, the first electronic device can determine the first channel of display data that is suitable for the apparatus type of the second electronic device. For the third electronic device, the second display request sent by the third electronic device can indicate the second display identifier. Accordingly, the first electronic device can determine the second channel of display data corresponding to the second display identifier.

In the present disclosure, the plurality of channels of display data can be configured at the first electronic device in various manners.

To facilitate understanding, for example, at least one virtual display can be established at the first electronic device, and channels of display data can be assigned to the virtual display and the physical display, respectively. In connection with an application scenario, the technical solution of the present disclosure is described.

Figure 3:
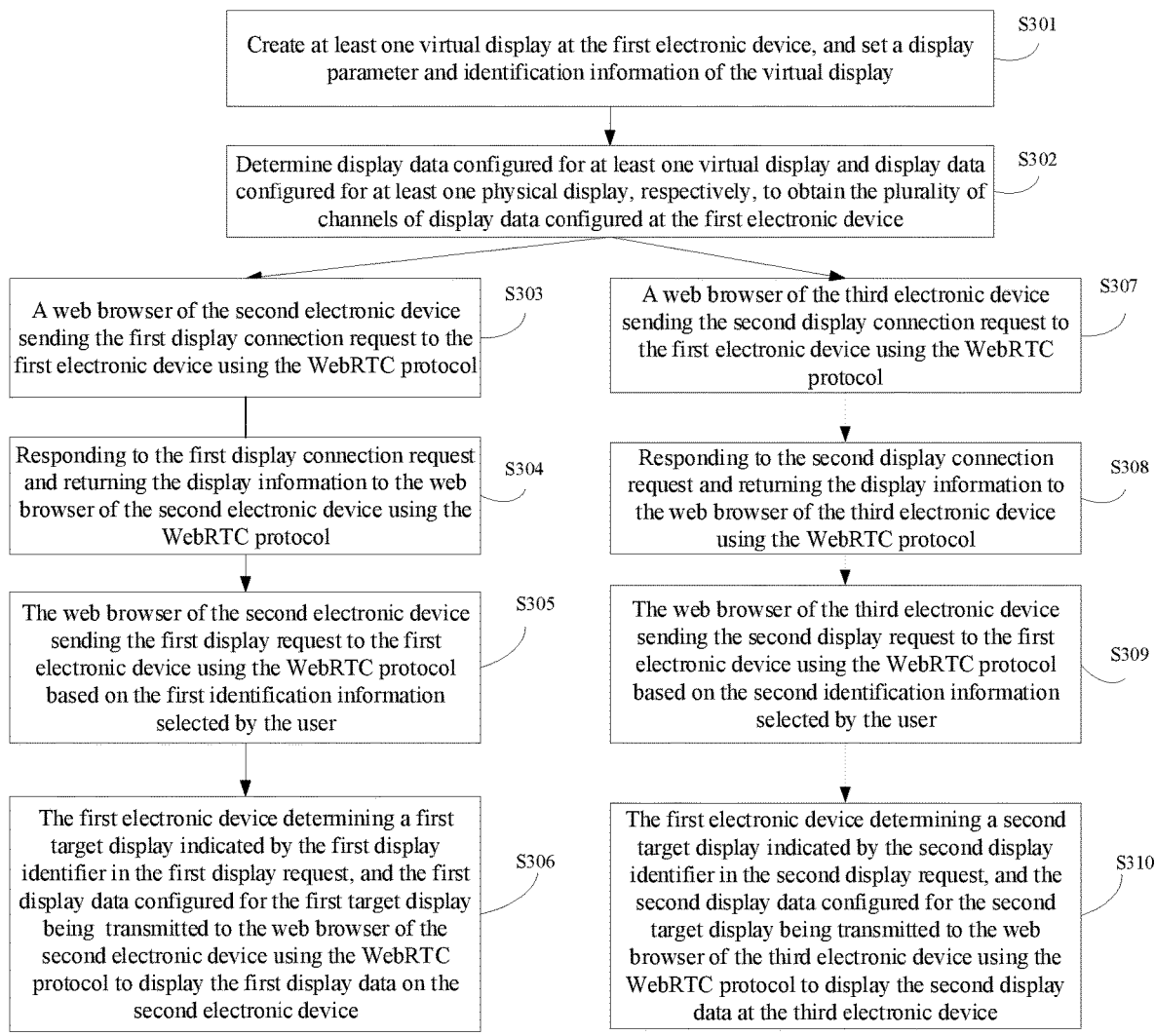
FIG. 3 illustrates a schematic flowchart of another display method according to some embodiments of the present disclosure.

FIG. 3 illustrates a schematic flowchart of another display method according to some embodiments of the present disclosure. In some embodiments, for example, a connection can be established among the electronic devices through the WebRTC protocol. The method of embodiments of the present disclosure includes the following processes.

At S301, at least one virtual display is created at the first electronic device, and a display parameter and identification information of the virtual display are set.

Each virtual display can be equivalent to a virtual driver. A real display can be simulated at the first electronic device through the virtual display.

For example, by calling an interface configured to create the virtual display of the operating system of the first electronic device, the virtual display can be created at the first electronic device. The virtual display can be created in different manners for different operating systems, which is not limited here.

The display parameter of the virtual display can include a resolution configured for the virtual display and another display-related parameter, which is not limited here.

The identification information of the virtual display can include an identifier used to uniquely identify the virtual display, Thus, different virtual displays can have different identification information in the first electronic device. Moreover, the identification information of the virtual display can also be different from the identification information of the physical display in the first electronic device.

Different virtual displays can correspond to different resource spaces. For example, different virtual displays can correspond to different memory spaces and other resources.

By creating the virtual display at the first electronic device, a display mode of the virtual display relative to the physical display at the first electronic device can also be set, and the display mode can include an extension mode and a duplication mode.

If the virtual display is set to be in the extension mode, the virtual display can be indicated to display a different display content from the physical display. If the virtual display is set to be in the duplication mode, the virtual display can be configured to present display data of a same display content as in the physical display. Each virtual display can be set with a corresponding mode independently. For example, virtual display 1 can be set to be in the extension mode, and virtual display 2 can be set to be in the duplication mode, or virtual display 1 and virtual display 2 can be set to be in a same mode.

During creating the virtual display through the operating system, the user can select to configure the display data used to be displayed for the virtual display, which is not limited. In some embodiments, after the virtual display is created, the user can also adjust the display data required by the virtual display as needed to change the display data configured for the virtual display.

At S302, the first electronic device determines display data configured for at least one virtual display and display data configured for at least one physical display, respectively, to obtain the plurality of channels of display data configured at the first electronic device.

The physical display can be a real display that the first electronic device has or is connected to.

In the present disclosure, the display data configured for the virtual display and the physical display is not limited.

Each channel of display data can correspond to one display. The display can be a physical display or a virtual display.

Since one channel of display data corresponds to one display (virtual display or physical display), the identification information of each display can represent the one channel of display data configured for the display. Thus, the identification information of the display can also be used as the display identifier of the one channel of display data configured for the display. That is, the display identifiers of the plurality of channels of display data can be the identification information of virtual displays or physical displays corresponding to the plurality of channels of display data.

In embodiments of the present disclosure, different kinds of display data can be configured for the virtual display and the physical display. For example, display data on a side of the first electronic device can be configured, and live broadcasting or video resources can also be determined to be the display data configured for the display, which is not limited here.

In some embodiments, a signaling service process and a display service process can be created at the first electronic device. The signaling service process and the display service process can support the WebRTC protocol. The signaling service process can be responsible for transmitting a control signal with another electronic device, for example, receiving the display connection requests and the display requests sent by the other electronic devices. The display service process can be used to provide the display data to other electronic devices.

Accordingly, the first electronic device can perform step S302 through the signaling service process.

At S303, a web browser of the second electronic device sends the first display connection request to the first electronic device using the WebRTC protocol.

For example, the first display connection request can be used to request to establish a WebRTC protocol connection for transmitting the display data or request to establish a data transmission connection.

The second electronic device can be an electronic device where the client terminal of the web browser is located. The second electronic device can be any electronic device supporting the web browser. For example, the second electronic device can be a cell phone, a smart TV, or a laptop computer.

At S304, the first electronic device responds to the first display connection request and returns the display information to the web browser of the second electronic device using the WebRTC protocol.

In some embodiments, the display information can include the identification information of the physical display and the at least one virtual display of the first electronic device. The display information can further include the display parameters of the virtual displays or the physical display corresponding to the plurality of channels of display data. The display parameter can include a parameter related to display performance including a resolution.

For example, when the signaling service process and the display service process are created at the first electronic device, the first electronic device can determine the display parameters and the identification information of the virtual display and the physical display through the display service process, and send the display parameters and the identification information of the displays to the signaling service process to realize information registration of the display service process to the signaling service process. Based on this, after the signaling service process of the first electronic device obtains the first display connection request, the display information can be returned to the web browser of the second electronic device.

At S305, the web browser of the second electronic device sends the first display request to the first electronic device using the WebRTC protocol based on the first identification information selected by the user.

The first display request can include the first display identifier. The first display identifier can belong to the identification information of the physical display and the at least one virtual display of the first electronic device. For example, the first display identifier may be identification information of a certain virtual display at the first electronic device or the identification information of the physical display.

After the second electronic device obtains the display information, the display information can be represented by the web browser for the user to select a display.

In some embodiments, the second electronic device can determine a virtual display or a physical display suitable for the display unit of the second electronic device according to the display parameter such as the resolution of the display unit to determine the first display identifier of the corresponding display.

At S306, the first electronic device determines a first target display indicated by the first display identifier in the first display request, and the first display data configured for the first target display is transmitted to the web browser of the second electronic device using the WebRTC protocol to display the first display data on the second electronic device.

The first target display can include the physical display and the at least one virtual display of the first electronic device. To facilitate distinguishment, the display indicated by the first display identifier can be referred to as the first target display.

The first electronic device can obtain the first display data configured for the first target display from the memory space of the first target display and transmit the first display data to the web browser of the second electronic device.

When the signaling service process and the display service process are created at the first electronic device, the first electronic device can obtain the first display identifier through the signaling service process and determine the first target display indicated by the first display identifier in the first display request. Then, the signaling service process can indicate the information of the first target display to the display service process. Based on this, the display service process can obtain the display data configured for the first target display and transmit the display data to the second electronic device.

In some embodiments, after obtaining the first display data through the web browser, the second electronic device can present the first display data based on the web browser. Thus, the data can be conveniently represented, which is beneficial to display a high-quality picture. If the second electronic device has another application supporting the data transmitted using the WebRTC protocol, the first display data can also be presented by another application, which is not limited here.

At S307, a web browser of the third electronic device sends the second display connection request to the first electronic device using the WebRTC protocol.

For example, the second display connection request can be used to request to establish a WebRTC protocol connection for transmitting the display data or request to establish a data transmission connection.

The third electronic device can be an electronic device where the client terminal of the web browser is located. The third electronic device can be a same type of electronic device as the first electronic device or the second electronic device, or a different type of electronic device, which is not limited here.

At S308, the first electronic device responds to the second display connection request and returns the display information to the web browser of the third electronic device using the WebRTC protocol.

For the display information, reference can be made to the above-related description, which is not repeated here.

At S309, the web browser of the third electronic device sends the second display request to the first electronic device using the WebRTC protocol based on the second identification information selected by the user.

The second display request can include the second display identifier. The second display identifier can belong to the identification information of the physical display and the at least one virtual display in the first electronic device.

At S310, the first electronic device determines a second target display indicated by the second display identifier in the second display request, and the second display data configured for the second target display is transmitted to the web browser of the third electronic device using the WebRTC protocol to display the second display data at the third electronic device.

The second target display can belong to the physical display and the at least one virtual display of the first electronic device.

An interaction process between the first electronic device and the third electronic device can be similar to an interaction process between the first electronic device and the second electronic device. Thus, steps S307 to S310 can be simply described. For a detailed description of steps S307 to S310, references can be made to the description of steps S303 to S306, which is not repeated here.

Figure 4:
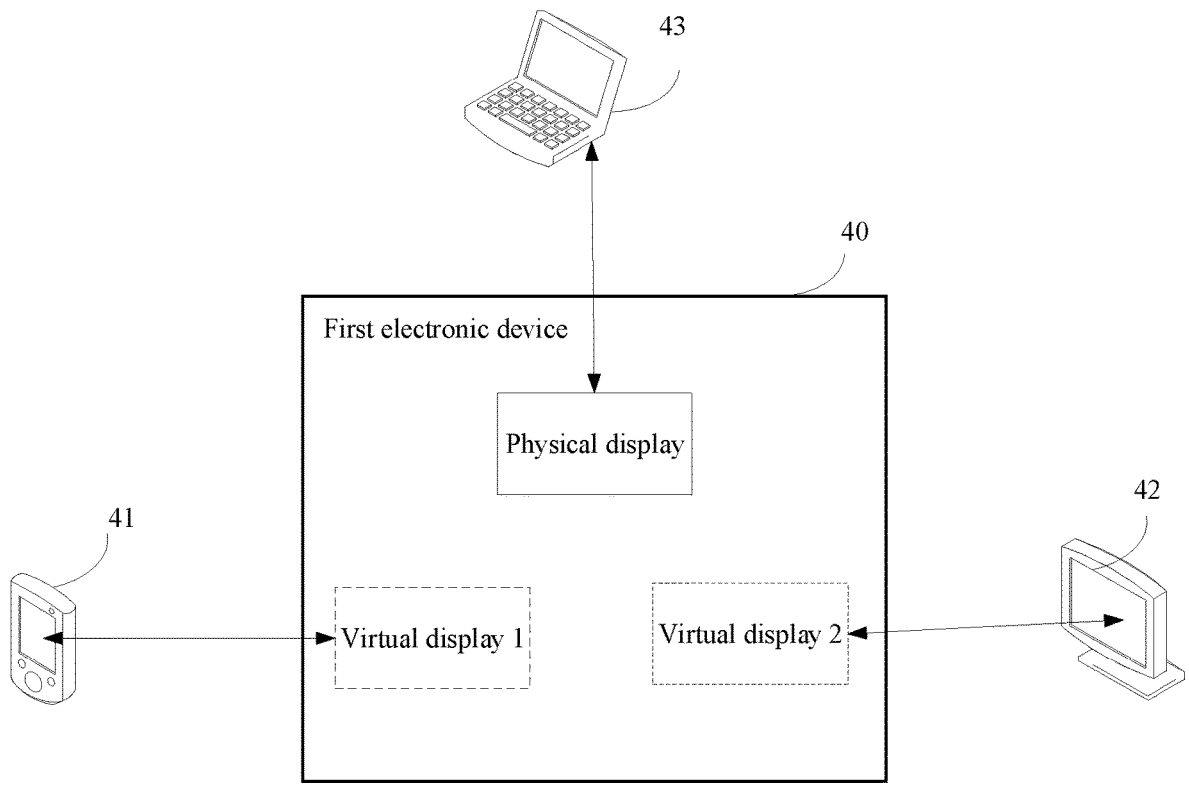
FIG. 4 illustrates a schematic diagram showing an application scenario of a solution according to some embodiments of the present disclosure.

Embodiments of the present disclosure are described in connection with an application scenario. FIG. 4 illustrates a schematic diagram showing the application scenario of a solution according to some embodiments of the present disclosure.

As shown in FIG. 4, the first electronic device is used as a main apparatus. The first electronic device transmits different channels of display data to three slave apparatuses. To facilitate description, the three slave apparatuses can be referred to as a second electronic device, a third electronic device, and a fourth electronic device, respectively. Assume that the first electronic device can be a laptop computer, the second electronic device can be a cell phone, the third electronic device can be a television, and the fourth electronic device can be a laptop computer.

The first electronic device, the second electronic device, the third electronic device, and the fourth electronic device can be in the same local area network or in a different local area network, i.e., in a remote network.

As shown in FIG. 4, the first electronic device 40 includes a physical display and virtual display 1 and virtual display 2 that are created.

For example, the operating system of the first electronic device can be a Windows operating system. The first electronic device can create the virtual display by calling an lddcx interface of the Windows operating system used for creating the virtual display.

Web browsers can be run at the second electronic device 41, the third electronic device 42, and the fourth electronic device 43. The operating systems of the second electronic device, the third electronic device, and the fourth electronic device can be the same as or different from the first electronic device, which is not limited.

Based on the technical solution in FIG. 3, the second electronic device 41 can establish a wireless connection with the first electronic device 40 using the WebRTC protocol through the Web browser of the second electronic device 41.

After the second electronic device 41 requests the display data of virtual display 1 from the first electronic device 40 based on the wireless connection, the first electronic device 40 can transmit the display data configured for virtual display 1 to the Web browser of the second electronic device 41 using the WebRTC protocol. Thus, the display data configured for virtual display 1 can be presented through the Web browser of the second electronic device 41. Thus, the display data of virtual display 1 can be projected to the second electronic device 41 in a wireless screen projection manner.

Similarly, after the Web browser of the third electronic device 42 requests the display data of virtual display 2 from the first electronic device 40 using the WebRTC protocol, the first electronic device 40 can transmit the display data configured for virtual display 2 to the Web browser of the third electronic device. Thus, the display data of virtual display 2 can be projected to the third electronic device 42 in the wireless screen projection manner.

Similarly, after the Web browser of the fourth electronic device 43 requests the display data of the physical display from the first electronic device 40 using the WebRTC protocol, the first electronic device 40 can transmit the display data displayed by the physical display to the fourth electronic device. Thus, the display data of the physical display can be projected to the fourth electronic device 43.

According to the above, if the display data configured for virtual display 1, virtual display 2, and the physical display is different, the first electronic device can extend the display units of the three electronic devices into extension screens of the first electronic device and display different display contents on the extension screens.

In some embodiments, the first electronic device, the second electronic device, the third electronic device, and the fourth electronic device can be assumed to be in the same local area network. For example, the first electronic device, the second electronic device, the third electronic device, and the fourth electronic device can be in a home local area network of a same user. Virtual display 1 can be configured with live broadcasting video data from a certain live broadcasting platform. Virtual display 2 can be configured with a local video image of the first electronic device. The physical display can be configured with data of displaying a certain file. Based on this, in the present disclosure, different display contents can be displayed at the three electronic devices through the first electronic device. Thus, the user can watch different contents through different electronic devices.

Moreover, the technical solution of the present disclosure does not limit the operating systems of the electronic devices, which are not limited to a specific operating system protocol. The plurality of other electronic devices besides the first electronic device can be conveniently used to represent different display data (or same display data) output by the first electronic device.

Embodiments of the present disclosure further provide a display device corresponding to the display method of embodiments of the present disclosure.

Figure 5:
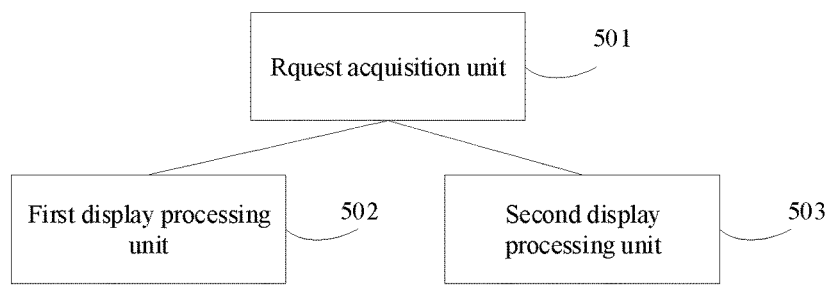
FIG. 5 illustrates a schematic structural diagram of a display device according to some embodiments of the present disclosure.

FIG. 5 illustrates a schematic structural diagram of the display device according to some embodiments of the present disclosure. The device of embodiments of the present disclosure can be applied to the first electronic device. The device includes a request acquisition unit 501, a first display processing unit 502, and a second display processing unit 503.

The request acquisition unit 501 can be configured to obtain the first display request sent by the second electronic device and the second display request sent by the third electronic device.

The first display processing unit 502 can be configured to determine the first channel of display data from the plurality of channels of display data configured at the first electronic device based on the first display request and transmit the first channel of display data to the second electronic device to output the first channel display data in the display unit of the second electronic device.

The second display processing unit 503 can be configured to determine the second channel of display data from the plurality of channels of display data based on the second display request and transmit the second channel of display data to the third electronic device to output the second channel of display data in the display unit of the third electronic device.

In some embodiments, the first display request obtained by the request acquisition unit can include the first display identifier used to indicate the display data or the type information used to indicate the apparatus type of the second electronic device.

Accordingly, the first display processing unit can include a first data determination unit or a second data determination unit.

The first data determination unit can be configured to determine the first channel of display data corresponding to the first display identifier from the plurality of channels of display data configured at the first electronic device.

The second data determination unit can be configured to determine the first channel of display data suitable for the apparatus type of the second electronic device from the plurality of channels of display data configured at the first electronic device.

In some other embodiments, the device can further include a first connection request unit and a first information return unit.

The first connection request unit can be configured to obtain the first display connection request sent by the second electronic device before the request acquisition unit obtains the first display request.

The first information return unit can be configured to respond to the first display connection request and return the display information to the second electronic device. The display information includes the display identifiers corresponding to the plurality of channels of display data configured at the first electronic device.

In some other embodiments, the request acquisition unit can obtain the second display identifier used to indicate the display data included in the second display request or the type information used to indicate the apparatus type of the third electronic device.

The second display processing unit can include a third data determination unit or a fourth data determination unit.

The third data determination unit can be configured to determine, from the second channel of display data corresponding to the second display identifier from the plurality of channels of display data.

The fourth data determination unit can be configured to determine the second channel display data suitable for the apparatus type of the third electronic device from the plurality of channels of display data configured at the first electronic device.

In some other embodiments, the device can further include a second connection request unit and a second information return unit.

The second connection request unit can be configured to obtain the second display connection request sent by the third electronic device before the request acquisition unit obtains the second display request.

The second information return unit can be configured to respond to the second display connection request and return the display information to the third electronic device. The display information can include the display identifiers corresponding to the plurality of channels of display data configured at the first electronic device.

In any device embodiment of the present disclosure, the request acquisition unit can further include a first request acquisition unit and a second request acquisition unit.

The first request acquisition unit can be configured to obtain the first display request sent by the second electronic device based on the real-time communication connection established between the first electronic device and the second electronic device. The real-time communication connection can be a wireless connection established based on the real-time communication protocol.

The second request acquisition unit can be configured to obtain the second display request sent by the third electronic device based on the real-time communication connection established between the first electronic device and the third electronic device.

In the above device embodiments of the present disclosure, the device can further include a creation unit and a data determination unit.

The creation unit can be configured to create the at least one virtual display at the first electronic device before the first display request and the second display request are obtained.

The data determination unit can be configured to determine the display data configured for at least one virtual display and the physical display of the first electronic device to obtain the plurality of channels of display data configured at the first electronic device.

In some other embodiments, the creation unit can include a creation sub-unit configured to create the at least one virtual display at the first electronic device and set the display parameter and the identification information of the virtual display.

When the device includes the first information return unit and the second information return unit, the display information returned by the first information return unit and the second information return unit can further include the display parameters of the virtual display or the physical display corresponding to the plurality of channels of display data. The display identifiers of the plurality of channels of display data can be the identification information of the virtual display or the physical display corresponding to the plurality of channels of display data.

Figure 6:
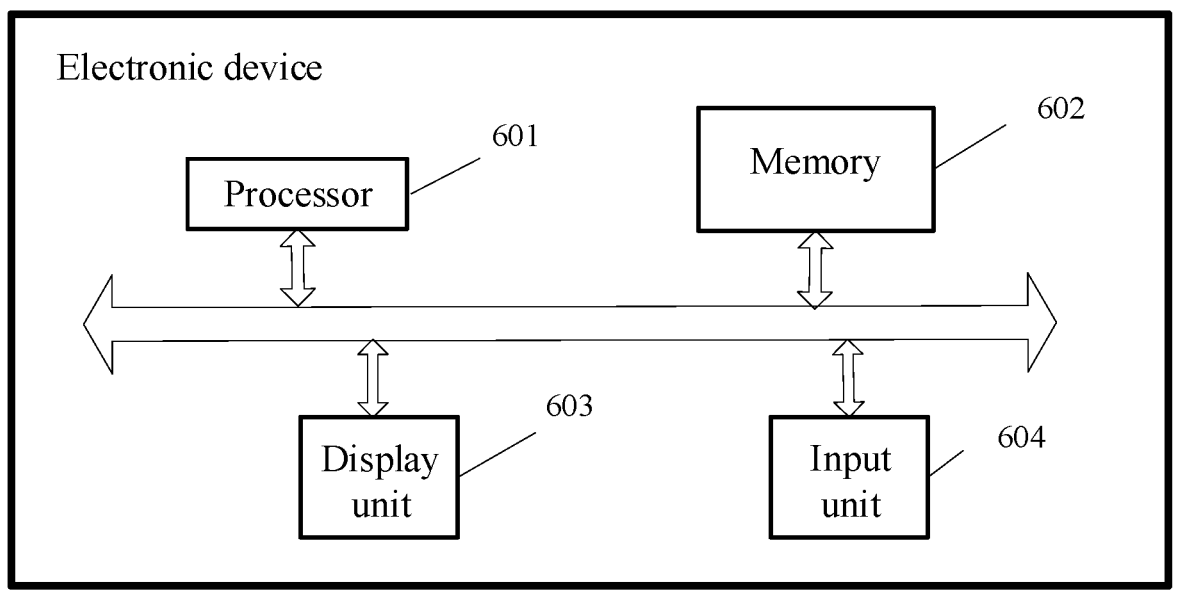
FIG. 6 illustrates a schematic structural diagram of an electronic device according to some embodiments of the present disclosure.

The present disclosure further provides an electronic device. FIG. 6 illustrates a schematic structural diagram of the electronic device according to some embodiments of the present disclosure. The electronic device can be any type of electronic device. The electronic device can implement the operation on the side of the first electronic device above.

In some embodiments, the electronic device includes one or more processors 601 and one or more memories 602.

The one or more processors 601 can be configured to perform the display method of embodiments of the present disclosure.

The one or more memories 602 can be used to store programs needed for the processor to perform the operation.

The electronic device further includes a display unit 603 and an input unit 604.

The electronic device can include more or fewer members than the electronic device shown in FIG. 6, which is not limited here.

Embodiments of the present disclosure further provide a computer-readable storage medium. The computer-readable storage medium can store at least one instruction, at least one program, a code set, or an instruction set. The at least one instruction, the at least one program, the code set, or the instruction set can be loaded by the one or more processors to perform the display method of embodiments of the present disclosure. is The present disclosure further provides a computer program including computer instructions. The computer instructions can be stored in the computer-readable storage medium. When the computer program is run on the electronic device, the display method of embodiments of the present disclosure can be executed.

Embodiments of the present disclosure are described in a progressive manner. Each embodiment focuses on differences from other embodiments. Same or similar parts of the embodiments can be referred to each other. Features recorded in embodiments of the present disclosure can be replaced by or combined with each other. Thus, those skilled in the art can implement the present dislosure. Since the device of embodiments of the present disclosure corresponds to the method of embodiments of the present disclosure, the description can be simple, and the relevant parts can be referred to the method part of embodiments of the present disclosure.

In the specification, relational terms such as first and second can be solely used to distinguish one entity or action from another entity or action without necessarily requiring or implying any such actual relationship or order between such entities or actions. Moreover, the terms "comprising," "including," or any other variation thereof are intended to cover a non-exclusive inclusion. Thus, a process, method, article, or apparatus that includes a list of elements does not include only those elements but can include other elements not expressly listed or inherent to such process, method, article, or apparatus. Without further limitation, an element defined by the phrase "comprising a . . . " does not exclude the presence of other identical elements in the process, method, article, or apparatus that includes the element.

The above description of embodiments of the present disclosure is provided to enable those skilled in the art to implement or use the present disclosure. Various modifications to the embodiments are apparent to those skilled in the art. The generic principles defined in the specification can be implemented in other embodiments without departing from the spirit or scope of the present disclosure. Thus, the present disclosure is not intended to be limited to the embodiments above but confirms to the widest scope consistent with the principles and novel features of the present disclosure.

The above are merely some embodiments of the present disclosure. For those skilled in the art, improvements and modifications can be made to embodiments of the present disclosure without departing from the principle of the present disclosure. These improvements and modifications should be within the scope of the present disclosure.

What is claimed is:

1. A display method applied to a first electronic device, comprising:
    obtaining a first display request sent by a second electronic device and a second display request sent by a third electronic device;
    determining a first channel of display data from a plurality of channels of display data configured at the first electronic device based on the first display request and transmitting the first channel of display data to the second electronic device to output the first channel of display data in a display unit of the second electronic device; and
    determining a second channel of display data from the plurality of channels of display data based on the second display request and transmitting the second channel of display data to the third electronic device to output the second channel of display data in a display unit of the third electronic device.

2. The method of claim 1, wherein:
    the first display request includes a first display identifier used to indicate display data or type information used to indicate an apparatus type of the second electronic device;
    determining the first channel of display data from the plurality of channels of display data configured at the first electronic device based on the first display request includes:
        determining the first channel of display data corresponding to the first display identifier from the plurality of channels of display data configured at the first electronic device; or
        determining the first channel of display data suitable for the apparatus type of the second electronic device from the plurality of channels of display data configured at the first electronic device.

3. The method of claim 2, further comprising, before obtaining the first display request:
    obtaining a first display connection request sent by the second electronic device; and
    responding to the first display connection request and returning display information to the second electronic device, wherein the display information includes display identifiers corresponding to the plurality of channels of display data configured at the first electronic device.

4. The method of claim 1, wherein:
    the second display request includes a second display identifier used to indicate display data or type information used to indicate an apparatus type of the third electronic device; and
    determining the second channel of display data from the plurality of channels of display data based on the second display request includes:
        determining the second channel of display data corresponding to the second display identifier from the plurality of channels of display data; or
        determining the second channel of display data suitable for the apparatus type of the third electronic device from the plurality of channels of display data.

5. The method of claim 4, further comprising, before obtaining the second display request:
    obtaining a second display connection request sent by the third electronic device; and
    responding to the second display connection request and returning display information to the third electronic device, wherein the display information includes display identifiers corresponding to the plurality of channels display data configured at the first electronic device.

6. The method of claim 1, wherein obtaining the first display request sent by the second electronic device and the second display request sent by the third electronic device includes:
    obtaining the first display request sent by the second electronic device based on a real-time communication connection established between the first electronic device and the second electronic device, the real-time communication connection being a wireless connection established based on a real-time communication protocol; and
    obtaining the second display request sent by the third electronic device based on a real-time communication connection established between the first electronic device and the third electronic device.

7. The method of claim 1, further comprising, before obtaining the first display request and the second display request:
    creating at least one virtual display at the first electronic device; and determining display data configured for at least one virtual display and a physical display of the first electronic device to obtain the plurality of channels of display data configured at the first electronic device.

8. The method of claim 7, wherein creating the at least one virtual display at the first electronic device includes:
creating the at least one virtual display at the first electronic device and setting a display parameter and identification information of the virtual display;
wherein:
in response to returning the display information to the second electronic device and the third electronic device, the display information further includes the display parameters of the virtual display or the physical display corresponding to the plurality of channels of display data; and
the display identifiers of the plurality of channels of display data are identification information of the virtual display or the physical display corresponding to the plurality of channels of display data.

9. A display device of a first electronic device comprising:
a request acquisition unit configured to obtain a first display request sent by a second electronic device and a second display request sent by a third electronic device;
a first display processing unit configured to determine a first channel of display data from a plurality of channels of display data configured at the first electronic device based on the first display request and transmit the first channel of display data to the second electronic device to output the first channel of display data in a display unit of the second electronic device; and
a second display processing unit configured to determine a second channel of display data from the plurality of channels of display data based on the second display request and transmit the second channel of display data to the third electronic device to output the second channel of display data in a display unit of the third electronic device.

10. The device of claim 9, wherein:
the first display request includes a first display identifier used to indicate display data or type information used to indicate an apparatus type of the second electronic device;
the first display processing unit is further configured to:
determine the first channel of display data corresponding to the first display identifier from the plurality of channels of display data configured at the first electronic device; or
determine the first channel of display data suitable for the apparatus type of the second electronic device from the plurality of channels of display data configured at the first electronic device.

11. The device of claim 9, wherein:
the second display request includes a second display identifier used to indicate display data or type information used to indicate an apparatus type of the third electronic device; and
the second display processing unit is further configured to:
determine the second channel of display data corresponding to the second display identifier from the plurality of channels of display data; or
determine the second channel of display data suitable for the apparatus type of the third electronic device from the plurality of channels of display data.

12. The device of claim 9, wherein the request acquisition unit includes:
a first request acquisition unit configured to obtain the first display request sent by the second electronic device based on a real-time communication connection established between the first electronic device and the second electronic device, the real-time communication connection being a wireless connection established based on a real-time communication protocol; and
a second request obtaining unit configured to obtain the second display request sent by the third electronic device based on the real-time communication connection established between the first electronic device and the third electronic device.

13. A non-transitory computer-readable storage medium storing a program instruction that, when executed by one or more processors, causes the one or more processors to:
obtain a first display request sent by a second electronic device and a second display request sent by a third electronic device;
determine a first channel of display data from a plurality of channels of display data configured at the first electronic device based on the first display request and transmit the first channel of display data to the second electronic device to output the first channel of display data in a display unit of the second electronic device; and
determine a second channel of display data from the plurality of channels of display data based on the second display request and transmit the second channel of display data to the third electronic device to output the second channel of display data in a display unit of the third electronic device.

14. The computer-readable storage medium of claim 13, wherein:
the first display request includes a first display identifier used to indicate display data or type information used to indicate an apparatus type of the second electronic device;
the one or more processors are further configured to:
determine the first channel of display data corresponding to the first display identifier from the plurality of channels of display data configured at the first electronic device; or
determine the first channel of display data suitable for the apparatus type of the second electronic device from the plurality of channels of display data configured at the first electronic device.

15. The computer-readable storage medium of claim 14, wherein the one or more processors are further configured to:
obtain a first display connection request sent by the second electronic device; and
respond to the first display connection request and return display information to the second electronic device, wherein the display information includes display identifiers corresponding to the plurality of channels of display data configured at the first electronic device.

16. The computer-readable storage medium of claim 13, wherein:
the second display request includes a second display identifier used to indicate display data or type information used to indicate an apparatus type of the third electronic device; and
the one or more processors are further configured to:

determine the second channel of display data corresponding to the second display identifier from the plurality of channels of display data; or determine the second channel of display data suitable for the apparatus type of the third electronic device from the plurality of channels of display data.

17. The computer-readable storage medium of claim 16, wherein the one or more processors are further configured to:

obtain a second display connection request sent by the third electronic device; and respond to the second display connection request and return display information to the third electronic device, wherein the display information includes display identifiers corresponding to the plurality of channels display data configured at the first electronic device.

18. The computer-readable storage medium of claim 13, wherein the one or more processors are further configured to:

obtain the first display request sent by the second electronic device based on a real-time communication connection established between the first electronic device and the second electronic device, the real-time communication connection being a wireless connection established based on a real-time communication protocol; and obtain the second display request sent by the third electronic device based on a real-time communication connection established between the first electronic device and the third electronic device.

19. The computer-readable storage medium of any of claim 13, wherein the one or more processors are further configured to:

create at least one virtual display at the first electronic device; and determine display data configured for at least one virtual display and a physical display of the first electronic device to obtain the plurality of channels of display data configured at the first electronic device.

20. The computer-readable storage medium of claim 19, wherein the one or more processors are further configured to:

create the at least one virtual display at the first electronic device and set a display parameter and identification information of the virtual display;

wherein:

in response to returning the display information to the second electronic device and the third electronic device, the display information further includes the display parameter of the virtual display or the physical display corresponding to the plurality of channels of display data respectively; and the display identifiers of the plurality of channels of display data are identification information of the virtual display or the physical display corresponding to the plurality of channels of display data.

* * * * *